United States Patent
Tian et al.

(10) Patent No.: US 8,977,038 B2
(45) Date of Patent: *Mar. 10, 2015

(54) APPARATUS AND METHOD FOR PROVIDING THREE DIMENSIONAL MEDIA CONTENT

(71) Applicant: AT&T Intellectual Property I, LP, Atlanta, GA (US)

(72) Inventors: Chao Tian, Madison, NJ (US); Vinay Anant Vaishampayan, Summit, NJ (US); Yifu Zhang, College Station, TX (US)

(73) Assignee: AT&T Intellectual Property I, LP, Atlanta, GA (US)

(*) Notice: Subject to any disclaimer, the term of this patent is extended or adjusted under 35 U.S.C. 154(b) by 116 days.

This patent is subject to a terminal disclaimer.

(21) Appl. No.: 13/847,241

(22) Filed: Mar. 19, 2013

(65) Prior Publication Data

US 2013/0208094 A1    Aug. 15, 2013

Related U.S. Application Data

(62) Division of application No. 12/855,669, filed on Aug. 12, 2010, now Pat. No. 8,428,342.

(51) Int. Cl.
*G06K 9/00* (2006.01)
*G06K 9/36* (2006.01)
*H04N 13/02* (2006.01)
*G06T 5/00* (2006.01)

(52) U.S. Cl.
CPC ............ *H04N 13/0203* (2013.01); *G06T 5/005* (2013.01); *G06T 2207/10012* (2013.01); *G06T 2207/10028* (2013.01)

USPC .......... 382/154; 382/285; 345/419; 356/12; 348/42

(58) Field of Classification Search
USPC ................... 382/154, 285; 345/419–427; 356/12–14; 348/42–60
See application file for complete search history.

(56) References Cited

U.S. PATENT DOCUMENTS

| | | | |
|---|---|---|---|
| 6,046,763 A * | 4/2000 | Roy | 348/47 |
| 8,306,314 B2 * | 11/2012 | Tuzel et al. | 382/153 |
| 8,351,685 B2 * | 1/2013 | Ho et al. | 382/154 |
| 8,355,565 B1 * | 1/2013 | Yang et al. | 382/154 |
| 8,411,934 B2 * | 4/2013 | Zhang et al. | 382/154 |
| 8,422,766 B2 * | 4/2013 | Zhang et al. | 382/154 |
| 8,428,342 B2 * | 4/2013 | Tian et al. | 382/154 |

(Continued)

OTHER PUBLICATIONS

Felzenszwalb et al., "Efficient Belief Propagation for Early Vision", 2004.*

(Continued)

*Primary Examiner* — Aaron W Carter
(74) *Attorney, Agent, or Firm* — Guntin & Gust, PLC; Ed Guntin

(57) ABSTRACT

A system that incorporates teachings of the exemplary embodiments may include, for example, means for generating a disparity map based on a depth map, means for determining accuracy of pixels in the depth map where the determining means identifies the pixels as either accurate or inaccurate based on a confidence map and the disparity map, and means for providing an adjusted depth map where the providing means adjusts inaccurate pixels of the depth map using a cost function associated with the inaccurate pixels. Other embodiments are disclosed.

20 Claims, 5 Drawing Sheets

(56) References Cited

U.S. PATENT DOCUMENTS

| | | | |
|---|---|---|---|
| 8,577,089 B2* | 11/2013 | Choi et al. | 382/106 |
| 8,774,512 B2* | 7/2014 | Yao et al. | 382/173 |
| 8,780,113 B1* | 7/2014 | Ciurea et al. | 345/427 |
| 2003/0202120 A1* | 10/2003 | Mack | 348/578 |
| 2003/0206652 A1* | 11/2003 | Nister | 382/154 |
| 2009/0116732 A1 | 5/2009 | Zhou et al. | |
| 2009/0129667 A1 | 5/2009 | Ho et al. | |
| 2010/0039502 A1* | 2/2010 | Robinson | 348/47 |
| 2010/0182410 A1 | 7/2010 | Verburgh et al. | |
| 2010/0208942 A1* | 8/2010 | Porter et al. | 382/106 |
| 2010/0208994 A1* | 8/2010 | Yao et al. | 382/173 |
| 2010/0315412 A1* | 12/2010 | Sinha et al. | 345/419 |
| 2010/0328475 A1* | 12/2010 | Thomas et al. | 348/222.1 |
| 2011/0025827 A1 | 2/2011 | Shpunt et al. | |
| 2011/0044531 A1* | 2/2011 | Zhang et al. | 382/154 |
| 2011/0069064 A1* | 3/2011 | Zhang et al. | 345/419 |
| 2011/0157178 A1* | 6/2011 | Tuzel et al. | 345/426 |
| 2011/0234756 A1* | 9/2011 | Adler et al. | 348/46 |
| 2011/0285813 A1 | 11/2011 | Girdzijauskas et al. | |
| 2011/0298898 A1 | 12/2011 | Jung et al. | |
| 2011/0304691 A1* | 12/2011 | Newton et al. | 348/43 |
| 2011/0305370 A1* | 12/2011 | Choi et al. | 382/106 |
| 2011/0316968 A1* | 12/2011 | Taguchi et al. | 348/36 |
| 2012/0039525 A1* | 2/2012 | Tian et al. | 382/154 |
| 2012/0056982 A1 | 3/2012 | Katz et al. | |
| 2012/0099836 A1 | 4/2012 | Welsh et al. | |
| 2012/0120073 A1 | 5/2012 | Haker et al. | |
| 2012/0321172 A1 | 12/2012 | Jachalsky et al. | |
| 2013/0033578 A1* | 2/2013 | Wajs | 348/46 |
| 2013/0033579 A1* | 2/2013 | Wajs | 348/46 |
| 2013/0050437 A1* | 2/2013 | Robinson | 348/47 |
| 2013/0113988 A1* | 5/2013 | Wajs | 348/362 |
| 2013/0124148 A1* | 5/2013 | Jin et al. | 703/1 |
| 2013/0208094 A1* | 8/2013 | Tian et al. | 348/46 |
| 2014/0153784 A1* | 6/2014 | Gandolph et al. | 382/107 |
| 2014/0232822 A1* | 8/2014 | Venkataraman et al. | 348/43 |
| 2014/0267243 A1* | 9/2014 | Venkataraman et al. | 345/419 |
| 2014/0321712 A1* | 10/2014 | Ciurea et al. | 382/106 |

OTHER PUBLICATIONS

Jachalsky, et al., "Reliability-Aware Cross Multilateral Filtering for Robust Disparity Map Refinement", 3DTV-CON, Jun. 2010.

* cited by examiner

100

200

500

APPARATUS AND METHOD FOR PROVIDING THREE DIMENSIONAL MEDIA CONTENT

CROSS-REFERENCE TO RELATED APPLICATIONS

This application is a divisional of and claims priority to U.S. patent application Ser. No. 12/855,669 filed Aug. 12, 2010, which is incorporated herein by reference in its entirety.

FIELD OF THE DISCLOSURE

The present disclosure relates generally to media content communication and more specifically to an apparatus and method for providing three dimensional media content.

BACKGROUND

Media consumption has become a multibillion dollar industry that continues to grow rapidly. High resolution displays are being introduced into the marketplace that can now present two-dimensional movies and games with three-dimensional perspective with clarity never seen before. However, capturing and/or generating the three-dimensional content still remains a costly and time-consuming effort.

DETAILED DESCRIPTION

One embodiment of the present disclosure can entail a system including means for generating a disparity map based on a depth map and means for determining accuracy of pixels in the depth map. The determining means can identify the pixels as either accurate or inaccurate based on a confidence map and the disparity map. The system can also include means for providing an adjusted depth map, where the providing means adjusts inaccurate pixels of the depth map using a cost function associated with the inaccurate pixels.

One embodiment of the present disclosure can entail a non-transitory computer-readable storage medium including computer instructions to generate three-dimensional media content based on an adjusted depth map and stereo image pairs and computer instructions to present the three-dimensional media content. The adjusted depth map can be based on adjustments to inaccurate pixels in a depth map using a suitable method, one example of which is the graph cut method, a second example of which is the belief propagation method.

One embodiment of the present disclosure can entail a method including obtaining a depth map and a confidence map associated with an object, and obtaining a stereo image pair of the object. The method can also include generating a disparity map based on the depth map, determining accuracy of pixels in the depth map based on the confidence map and the disparity map, and adjusting inaccurate pixels of the depth map to generate an adjusted depth map using a cost function associated with the inaccurate pixels.

Figure 1:
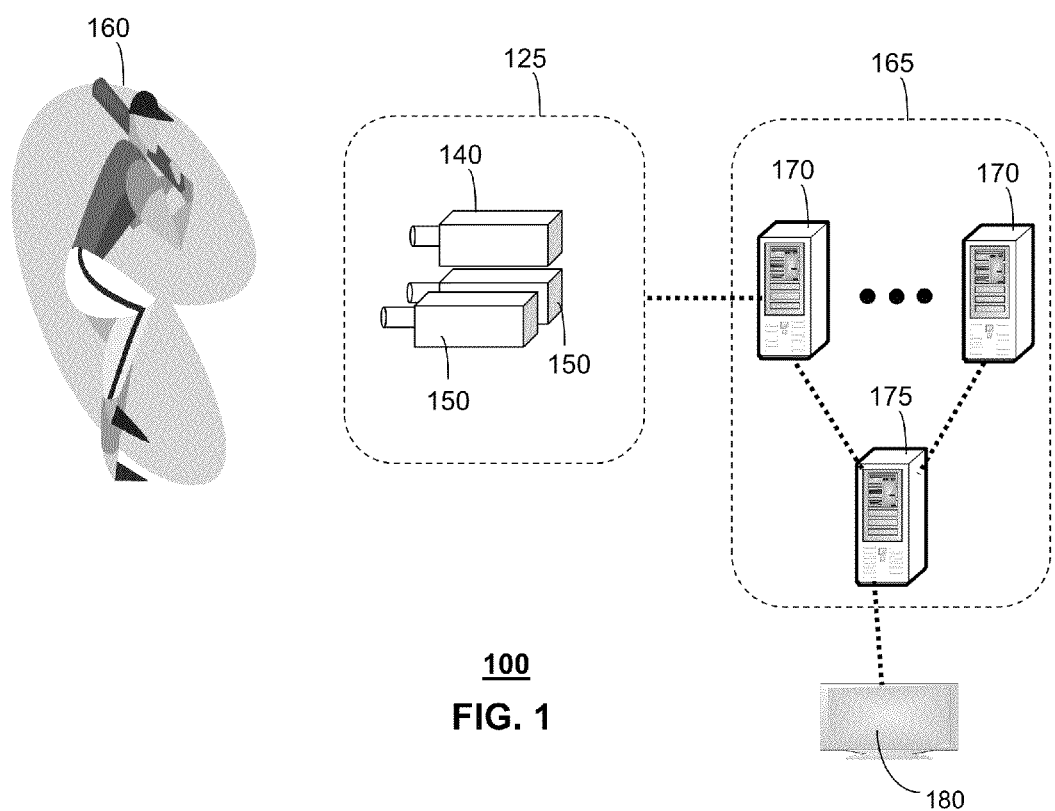
FIG. 1 depicts an illustrative embodiment of communication system that provides three dimensional media content.

FIG. 1 depicts an illustrative embodiment of a first communication system 100 for delivering or otherwise providing Three-Dimensional (3D) media content. System 100 can comprise a camera system 125 that captures images of an event or object 160. The event 160 can be of various types, such as a live sporting event or an event in a recording studio.

In one embodiment, the camera system 125 can include a range device 140 (e.g., a range camera) and one or more vision cameras 150. In this embodiment, the range device 140 will be referred to as a range camera, but it should be understood that other range devices could be utilized, including a sweeping range finder. The range camera 140 can provide an image showing or otherwise indicating the distance to points in a scene from a specific point. The resulting image can have pixel values which correspond to the distance, e.g., brighter values meaning shorter distance, or vice versa.

In the depicted configuration of FIG. 1, there are two vision cameras 150 which are a stereo vision pair (referred to as the 1+2 system). However, the present disclosure contemplates other numbers of cameras, such as one range camera 140 and one vision camera 150 (referred to as the 1+1 system). In this embodiment, the two vision cameras 150 can be placed at approximately the same height focusing on the object 160, with a horizontal distance between them that allows for generation of 3D images, such as 15 cm between their centers. Each vision camera 150 can have a sufficient resolution for 3D imaging, such as 1920×1080 (HD resolution), although other resolutions (e.g., 960×540) can be utilized based on a number of factors, including compatibility with the display device 180. The vision cameras 150 can be of various types that utilize various components. For example, the vision camera 150 can comprise Charge Coupled Device (CCD) image sensors, although other components in addition to, or in place of, the CCD sensors can also be utilized. In another example, the vision camera 150 can be compliant with the GigE Vision™ standard, although the present disclosure contemplates the vision camera operating otherwise, including in accordance with other standards and protocols, such as GenICam or EMVA 1288. In one embodiment, the display device 180 can be an auto-stereoscopic 3D display, although other types of display devices are also contemplated.

In one embodiment, the range camera 140 can be a camera that actively measures the time of flight of infrared light in order to provide depth map information at video frame rates. For example, the range camera 140 or other range finding device can measure parameters associated with the infrared light, such as the phase of the reflected wave or the intensity of the reflected wave. As another example, the range camera 140 can operate with a resolution of 176×144 utilizing a central wavelength of 850 nm, although range cameras or other range finding devices with different resolutions and/or different wavelengths can also be utilized in the exemplary embodiments. Other range imaging techniques are also contemplated by the present disclosure, including stereo triangulation, sheet of light triangulation, structured light, interferometry and coded aperture analysis. The range camera 140 can be placed on top of, or in close proximity to, one of the vision cameras 150 (e.g., the left vision camera) at a distance sufficient for identifying the range associated with the event 160 and the images captured by vision cameras 150, such as at a vertical distance of approximately 6 cm above the vision cameras. The field of view of the range camera 140 can be wider than the field of view of the vision cameras 150. For example, the difference in the field of view between the range camera 140 and the vision cameras 150 can effectively result in a 10×10 spatial resolution ratio between the vision camera and the range camera, although the present disclosure is not intended to be limited to this resolution ratio.

The camera system 125 can be in communication with or otherwise coupled to a computer system 165 having one or more computing devices, such as servers 170 and 175. The particular number, configuration, and location of the computing devices of system 165 can vary. The communication between the camera system 125 and the computer system 165 can be via a hardwire link, although wireless communication for some or all of the data transfer between the cameras 140, 150 and the computer system 165 is also contemplated. In one embodiment, the range camera 140 can be in communication with or connected to a host server 170 of the computer system 165, such as by a USB cable, and each vision camera 150 can be in communication with or connected to the host server 170, such as via an Ethernet cable. For example, there can be a plurality of host servers 170 that are each dedicated to one of the cameras 140 and 150 (including a dedicated host server for each vision camera 170).

Video frames can be collected onto a central server 175 of the computer system 165 for subsequent processing. In one embodiment to maintain synchronization, the cameras 140 and/or 150 can be hardware-triggered by a signal generator, such as at a frequency of 20 Hz, although other frequencies are also contemplated. The integration time of the range camera 140 can be set at a value based on time-resolution and noise level so as to achieve a balance between the two, such as at approximately 3.3 ms. The vision cameras 150 can output color video frames, while the range camera 140 can output grey-scale frames, such as with a bit-depth of 16 bits, although other bit-depths are also contemplated. The range camera 140 can generate three maps with consistent pixel correspondence: a depth map, an intensity (or magnitude) map and a confidence map. The intensity map can be similar to that produced by a vision camera, and can be used to facilitate joint calibration with the vision cameras 150 since unlike the depth map, it also bears texture information of the event 160. The confidence map reflects the confidence on the accuracy of the depth map for each pixel, and together with other information, it can be used by the computer system 165 or some other processor to generate a confidence-based classification that is utilized in generating the 3D media content which is presentable on display device 180.

Figure 2:
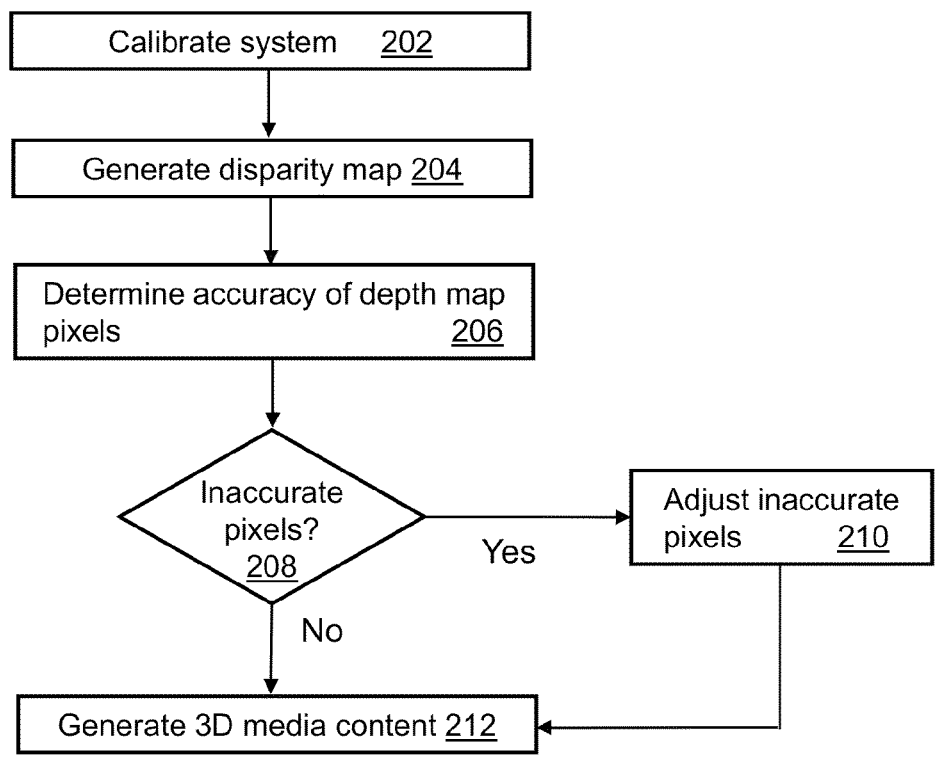
FIG. 2 depicts an illustrative embodiment of a method that can operate in the system of FIG. 1.

FIG. 2 depicts an illustrative embodiment of a method 200 operating in portions of the devices and systems described herein and/or illustrated in FIG. 1. Method 200 can begin with step 202 in which calibration of the camera system 125 can be performed.

The calibration can be performed for cameras having different resolutions. In one embodiment, the stereo camera pair 150 can be calibrated using calibration techniques available in a software library, and then the image pair can be rectified. The mapping from the low resolution depth map of the range camera 140 into the coordinate and resolution of one rectified vision camera (e.g., the left camera) can be performed through a homographic warping approximation. In one embodiment, the warping process can cause a slight misalignment between the maps, which can be taken into account in subsequent processing steps.

In step 204, a disparity map can be generated based on the depth map captured by the range camera 140. The depth information can be extracted in the form of disparity information. After rectification, the epipolar geometry provides that each pixel on the left image corresponds to some pixel on the right image on the same horizontal line. This constraint can reduce the number of candidates in the correspondence matching in stereo vision. The difference (in image coordinates) between the corresponding pixels in the left image and the right image is the disparity, which is roughly inversely proportional to the depth of the object for that pixel. Since the range camera 140 outputs the depth directly instead of disparity values, the depth map can be converted into a disparity map for the 1+2 system. The relation between the disparity d and depth Z is given by:

$$d = p_r - p_1 + \frac{fT_x}{Z}$$

where $p_1$ and $p_r$ are the principle point horizontal coordinates in the images, f is the focal length, and $T_x$ is the horizontal translation between the two cameras. These parameters can be obtained after performing the calibration procedure for the stereo vision camera pairs 150.

After performing the steps described above, there are four synchronized maps (images) at the same resolution to utilize for the 1+2 system: a blurry disparity map, a blurry confidence map and two rectified stereo vision camera image pairs. Both the disparity map and the confidence map can be in the viewpoint of the left (or right) vision camera 150. For the 1+1 system, there would be only one vision camera image.

Method 200 now performs steps to refine the blurry disparity map into a map with clearly defined boundaries, and to correct the inaccurate disparities, such as caused by any undesired level of reflectiveness in the range camera 140. In step 206, the accuracy of the depth map pixels can be determined. The pixels in the depth map can be categorized as either accurate or inaccurate. For example, the depth map pixels can be deemed accurate or inaccurate based on the confidence map and disparity map. In one embodiment, two types of inaccuracies can be determinative of this categorization. The first type is blurriness resulting from upsampling from the low resolution range camera map where certain pixels concentrate near the edge of the object boundaries. To locate these pixels, the variance of disparities within a predetermined window for each pixel (e.g., a 5×5 window) of the upsampled disparity map can be computed. If the variance is above a certain threshold, such as 50% of the global average variance (although other thresholds can be utilized), then the disparity value of the pixel can be classified as inaccurate.

The second type of inaccuracies can be due to poor reflectiveness. These pixels have low confidence level in the range camera confidence map. The confidence map generated by the range camera 140 can be based on the received light intensity and variance of the range camera sensor. A thresholding method can be utilized (e.g., 40% of the dynamic range of the confidence map—although other thresholds can be utilized), below which the disparity value for the pixel can be classified as inaccurate. If the disparity value of a pixel is classified as inaccurate for either one of the above two criteria, then it is classified as inaccurate as in step 208, and can be subject to further processing as described below for step 210. Otherwise, the disparity value can be deemed accurate and is not to be changed in the subsequent processing steps.

As described above, homographic warping may result in a slight misalignment between the range camera disparity map and vision camera left image. To account for this possible misalignment, the inaccurate region can be enlarged by also including pixels for which there exists a pixel deemed inaccurate and within a pre-determined distance, such as two or less pixels.

Figure 3:
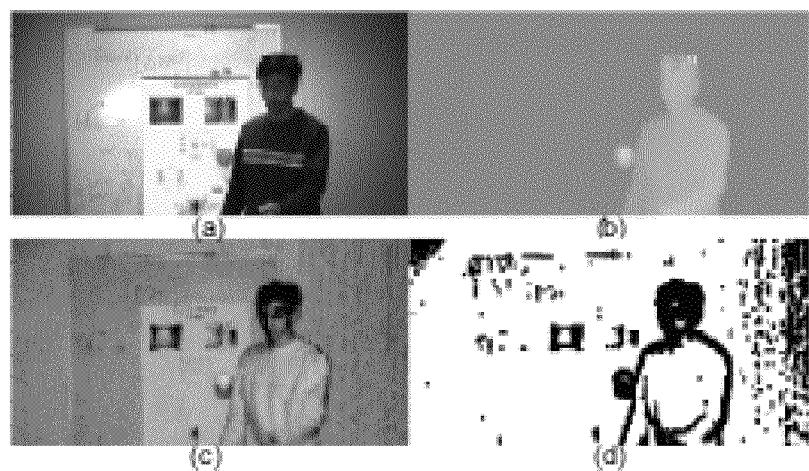
FIG. 3 depicts various images or maps generated using the system and methodology of FIGS. 1 and 2: (a) left vision camera image; (b) upsampled disparity map; (c) upsampled confidence map where darker regions indicate lower confidence; and (d) classification into accurate (white) and inaccurate (black) regions.

In FIG. 3, a frame captured by the vision camera 150 (left pair camera in this example) is shown in (a); the upsampled disparity map is shown in (b); the upsampled confidence map is shown in (c) where darker regions indicates lower confidence; and the corresponding classification map is shown in (d) where accurate regions are in white and inaccurate regions are in black. It can be seen that the pixels that are classified as inaccurate largely concentrate around the boundary of the object, and in the areas of low confidence. The number of pixels for which the disparities are to be further computed has been significantly reduced (to approximately 20% of the original total number of pixels), which can help reduce the use of processing resources.

In step 210, the pixels deemed inaccurate can be subject to adjustment such as by defining a cost function associated with the image data and optimizing or otherwise adjusting the data based on the cost function. In one embodiment, the adjustments can be made based on a graph-cut or belief-propagation process. For example, a heuristic cost function can be minimized using graph-cut analysis based on the original disparity values from the range camera 140, as well as the stereo vision camera pair in the 1+2 system. In another example, for the 1+1 system, strong depth continuity of the object (with similar colors) can be utilized in the analysis. A number of different cost functions can be defined for the pixels, including cost functions that analyze occlusions. In one embodiment, the cost function to be minimized can be defined as follows:

$$E(f) = \sum_{(p,q) \in N} V_{p,q}(f_p, f_q) + \sum_{p \in P} D_p(f_p)$$

In this cost function, N is the set of interacting pair of pixels, which are typically adjacent pixels; P is the set of all pixels; and f's are the variables in the optimization problem, which in the current setting are the disparity values for the pixels classified as inaccurate. The first term in the cost function is the smoothness term, which can enforce a smoothness constraint between adjacent disparity assignment. The second term in the cost function is the data term, which enforces a disparity assignment that is consistent with the data (e.g., the original disparity map and the stereo vision camera image pair). In this embodiment, the smoothness term can be selected as the following function:

$$V_{p,q}(f_p, f_q) = \lambda_s \cdot \frac{\exp\left(-\frac{\sum_{i=r,b,g}(I_p(i) - I_q(i))^2}{2\bar{I}^2}\right) + \delta}{1 + \delta}$$

where (r, g, b) are the three color components in the vision camera image, and $I_p$ and $I_q$ are the magnitude values of the color components, and $\bar{I}^2$ is a globally averaged squared difference between adjacent pixels. The value $\delta$ is a dilution constant which is chosen as 0.1. The weight $\lambda_s$ chosen to be 6.0. The present disclosure also contemplates selecting other values for the dilution constant and the weight, which can depend on various factors.

The data term incorporates two kinds of information and the corresponding heuristics in the 1+2 system. The disparity assignment can be favored if it is close to the disparity value of the range camera 140. The disparity assignment can be favored if it is consistent with the stereo matching of the vision camera stereo pair. To include the first heuristic, a truncated absolute value function can be utilized:

$$D_{rc}(f) = \min(|f - f_{rc}|, H_{rc})$$

where $f_{rc}$ is the disparity value of the range camera 140, and $H_{rc}$ is the threshold value. In general, this function can favor values close to the disparity value of the range camera 140; however, it can also assign a reasonable cost to values that are very different from the range camera disparity value to compensate for any possible inaccuracy of the range camera. The second heuristic can be incorporated by using a dissimilarity measurement, denoted as $D_{bt}$ (f), between the left and right image at a certain disparity. For instance, the dissimilarity measurement can be a Birchfield and Tomasi measurement as described in "A pixel dissimilarity measure that is insensitive to image sampling" by S. Birchfield and C. Tomasi, IEEE Trans. Pattern Analysis and Machine Intelligence, vol. 20, no. 4, pp. 401-406, April 1998, the disclosure of which is hereby incorporated by reference.

In one example, the final form of the function $D_p(f_p)$ for the 1+2 system can be:

$$D_p(f_p) = \begin{cases} D_{rc}(f_p) & C_{rc}(p) \geq C_{th} \\ \lambda_{bt} \cdot D_{bt}(f_p) & \text{otherwise} \end{cases}$$

where $C_{rc}(p)$ is the range camera confidence value at pixel p, $C_{th}$ is a fixed threshold, and the weight coefficient $\lambda_{bt}$ is selected to be 3.0, although other values for the weight coefficient can be selected based on the particular situation. In one embodiment, when the confidence is higher than $C_{th}$, then only the range camera disparity information in the data term is taken into account, and for the other case, only the stereo vision camera information is taken into account. $C_{th}$ can be selected as 25% of the dynamic range of the range camera confidence map, although other values can be selected based on a number of factors. For the 1+1 system, $D_p(f_p) = D_{rc}(f_p)$. However, the present disclosure contemplates other formulas being utilized for the function $D_p(f_p)$.

In step 210, 3D media content can be generated from the adjusted depth map. For example, the generated disparity/depth maps with the texture map from one or both of the vision cameras can be utilized as an input to an autostereoscopic 3D display, which has the ability to render multiple views automatically with this information.

Figure 4:
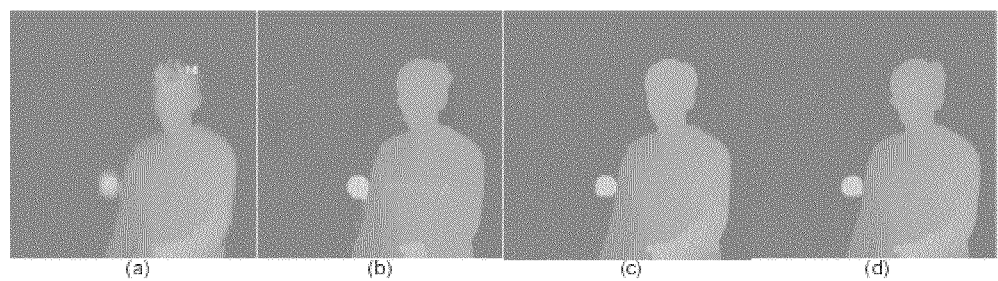
FIG. 4 depicts various images or maps associated with the object of FIG. 3: (a) original upsampled disparity map; (b) result generated without confidence classification for the 1+2 system; (c) result for the 1+1 system with confidence classification and (d) result for the 1+2 system with confidence classification.

In FIG. 4, results from the above steps of method 200 are shown in comparison with a map without confidence classification. FIG. 4 also shows the original directly upsampled map. It can be seen that the result without the confidence classification is more noisy, and at the same time, because of the strong continuity constraint that needs to be enforced, depth details on the object are missing, such as the hand-arm region. In contrast, the steps of method 200 using confidence classification for either the 1+1 system or the 1+2 system preserve much of the details within the same object, while at the same time offer improved boundary definition compared with the original directly upsampled map.

In another embodiment, a low resolution range camera, which is able to produce a depth image and the corresponding intensity image, and a high resolution vision camera can be positioned closely to each other, facing an object. The low resolution depth image can be mapped into the view point of the high-resolution vision camera, at the resolution of the vision camera (e.g., having eventually the depth image and vision camera image aligned at the viewpoint and resolution of the vision camera). This mapping procedure can be performed once for a fixed camera system setup, and the computed mapping/procedure can then be used for all the video sequences. A calibration board can be used for the purpose of extracting feature points in order to compute this mapping.

Notationally, we have range camera depth images $D_r(x_r, y_r)$, range camera intensity images $I_r(x_r, y_r)$, and vision camera images $I_v(x_v, y_v)$. A depth image can be generated: $D_v(x_v, y_v)$. Applying a homogeneous coordinate system to the multiview images, the pixel in the range camera is denoted by $(x_r', y_r', z_r')$, resulting in the following:

$$x_r = \frac{x_r'}{z_r'}, y_r = \frac{y_r'}{z_r'}$$

A pixel in the vision camera view in terms of the homogeneous coordinate is denoted as $(x_v', y_v', z_v')$. Homographic mappings from range image to vision image can be employed. When the radial distortion is ignored, and each camera is only taken as a pin-hole model, the mapping is a homography at each fixed depth. For each depth d, there is a single linear mapping between the range camera coordinates and the vision camera coordinates:

$$\begin{bmatrix} x_v' \\ y_v' \\ z_v' \end{bmatrix} = \begin{bmatrix} R_{11}(d) & R_{12}(d) & R_{13}(d) \\ R_{21}(d) & R_{22}(d) & R_{23}(d) \\ R_{31}(d) & R_{32}(d) & R_{33}(d) \end{bmatrix} \begin{bmatrix} x_r' \\ y_r' \\ z_r' \end{bmatrix}$$

The pixel $D_v(x_v, y_v) = D_v(x_v'/z_v', y_v'/z_v')$ will thus take the depth value of d. Because the homography is depth-dependent, many such mappings can be determined. The range camera coordinates $(x_r, y_r)$ are on an integer lattice (grid), but the mapped coordinates $(x_v, y_v)$ are not necessarily an integer, and thus a rounding procedure can be applied. Because the range camera has a much lower resolution than the vision camera, after the direct mapping above, the resulting depth image has many pixels that are not assigned a depth value, i.e., "holes" in the upsampled depth map $D_v(x_v, y_v)$. To remove these holes, interpolation can be applied.

In another embodiment, instead of using many mappings, if the object in the scene is in fact limited to a narrow depth range, then a single homographic mapping can be used instead to approximate the mapping. If a single mapping is to be used, then the reverse homographic mapping can be applied:

$$\begin{bmatrix} x_r' \\ y_r' \\ z_r' \end{bmatrix} = \begin{bmatrix} R_{11} & R_{12} & R_{13} \\ R_{21} & R_{22} & R_{23} \\ R_{31} & R_{32} & R_{33} \end{bmatrix} \begin{bmatrix} x_v' \\ y_v' \\ z_v' \end{bmatrix}$$

and thus there is no black-holes in the resulting map, so that interpolation need not be applied. The mappings may be good for some region of the images, but less satisfactory for the other regions.

Continuing with this example, the 3D space is being essentially partitioned into many pieces, and each piece is associated with a different mapping. The mapping can be either piece-wise affine or homographic. For the piece-wise affine mapping, an affine mapping between the range camera coordinates and the vision camera coordinates is utilized as follows:

$$\begin{bmatrix} x_r \\ y_r \end{bmatrix} = \begin{bmatrix} R_{11} & R_{12} \\ R_{21} & R_{22} \end{bmatrix} \begin{bmatrix} x_v \\ y_v \end{bmatrix} + \begin{bmatrix} T_1 \\ T_2 \end{bmatrix}$$

This mapping finds for each vision camera pixel a corresponding pixel in the range camera view, and interpolation is not required for the resulting map. The pixel $D_v(x_v, y_v)$ can take the depth value of $D_r(x_r, y_r)$, after rounding $(x_r, y_r)$ to integers. A single such mapping can be determined through a set of n corresponding feature points in the two views:

$$(x_v(1),y_v(1)),(x_v)(2),y_v(2)), \ldots ,(x_v(n),y_v(n))$$

and $$(x_r)(1),y_r(1)),(x_r)(2),y_r(2)), \ldots ,(x_r)(n),y_r(n))$$

which can be rewritten as follows:

$$\begin{bmatrix} x_v(1) & y_v(1) & 0 & 0 & 1 & 0 \\ 0 & 0 & x_v(1) & y_v(1) & 0 & 1 \\ x_v(2) & y_v(2) & 0 & 0 & 1 & 0 \\ 0 & 0 & x_v(2) & y_v(2) & 0 & 1 \\ \vdots & \vdots & \vdots & \vdots & \vdots & \vdots \\ x_v(n) & y_v(n) & 0 & 0 & 1 & 0 \\ 0 & 0 & x_v(n) & y_v(n) & 0 & 1 \end{bmatrix} \begin{bmatrix} R_{11} \\ R_{12} \\ R_{21} \\ R_{22} \\ T_1 \\ T_2 \end{bmatrix} = \begin{bmatrix} x_r(1) \\ y_r(1) \\ x_r(2) \\ y_r(2) \\ \vdots \\ x_r(n) \\ y_r(n) \end{bmatrix}$$

If $n \geq 3$, the above linear equation is usually over-determined (except that all points are on a single line), and thus the following variables can be solved for:

$$M = [R_{11}, R_{12}, R_{21}, R_{22}, T_1, T_2]^t$$

in the least squared manner, which gives the desired mapping.

To find the overall mapping, a first step is to find the multiple mapping vectors and this is done before run-time, and then a second step is the mapping selection done during run-time. To find the multiple mapping vectors, the feature points can be extracted from the intensity map of the range camera output, and the vision camera output. Since the intensity map and the depth map of the range camera can be aligned, the depth of a given feature point is also available. Feature points can be collected (usually corner points on a chess-board-pattern calibration board) near several candidate depths (e.g., $d_1, d_2, \ldots d_l$). A rectangular vision camera frame can be partitioned horizontally into $N_h$ stripes, and then vertically into $N_v$ stripes. At each candidate depth, multiple feature points can be collected, and they can belong to a certain partition. The mapping vector M (m; k; i) can be determined for each partition and each candidate depth, i.e., for m=1, 2, \ldots, $N_h$, k=1, 2, \ldots, $N_v$ and i=1, 2, \ldots, l. The partition of the vision camera frame can be kept the same for all the chosen depths. By increasing the number of partitions in the vision camera frame and the number of candidate depths, the accuracy of the mapping can be increased at the expense of an increased number of mappings, and heavier computation in the mapping selection step below.

Mapping for each pixel in the vision frame can then be performed. For a given pixel $(x_v, y_v)$, the partition $(m_0, k_0)$ to which it belongs is known, however since the depth of this pixel is not known, which mapping vector M (m; k; i) to use among i=1, 2, ..., l is unknown. All l mappings of this partition $(m_0, k_0)$, i.e., M(m; k; i), i=1, 2, ..., l can be applied, and this gives us l pixel locations in the depth map, and thus a total of l possible depths, denoted as $d_1'$, $d_2'$, ... $d_l'$. These l mappings do not need to be computed for each video frame, but instead, can be computed once because they are fixed for all the frames, though the resulting possible depths $d_1'$, $d_2'$, ... $d_l'$ can be taken from the range camera output. One depth can be chosen and $|d_i'-d_i|$ can be computed. The $i_0$th mapping can be selected where:

$$i_0 = \arg_i{}^{min} |d'_i - d_i|$$

This can be done for all the pixels within the high-resolution vision frame, resulting in a high-resolution depth map. The minimization above is based on knowing the depth of the pixel at $(x_v, y_v)$, and then selecting the particular mapping for that depth. The mapping above is piece-wise affine within a three-dimensional area. The "done-once" part of this procedure can be finding the mapping coefficients for each three-dimensional cell and all the l separate mappings between coordinates, and the run-time computation can be limited to only the minimization step, which is linear in l. Since the value of l is typically small, this procedure is efficient. In the above example, the focus was on the affine mapping formula. However, it is also possible to use homographic mapping. The principle is the same, however since the homography has nine parameters, a selection of at least five feature points in each partition for each candidate depth can be made. The least squared solution is also slightly different, because now the equation is homogeneous, but this can also be performed.

Figure 5:
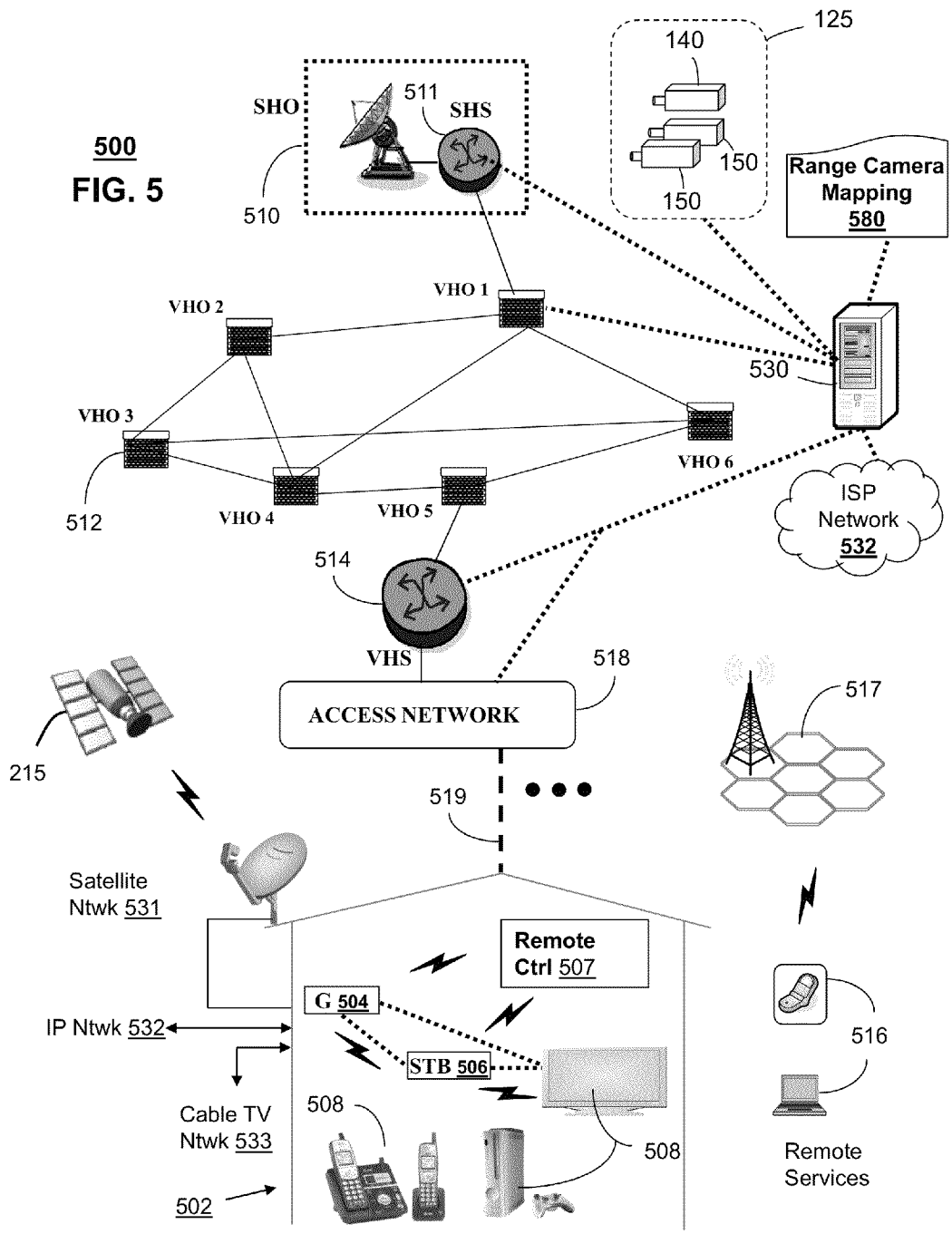
FIG. 5 depicts an illustrative embodiment of another communication system that provides three dimensional media content.

FIG. 5 depicts an illustrative embodiment of a second communication system 500 for delivering media content including 3D media content. The communication system 500 can represent an Internet Protocol Television (IPTV) broadcast media system, although other media broadcast systems are contemplated by the present disclosure. The IPTV media system 500 can include a super head-end office (SHO) 510 with at least one super headend office server (SHS) 511, which can receive media content from satellite and/or terrestrial communication systems. In the present context, media content can represent audio content, moving image content such as videos, still image content, or combinations thereof. The SHS server 511 can forward packets associated with the media content to video head-end servers (VHS) 514 via a network of video head-end offices (VHO) 512 according to a common multicast communication protocol.

The VHS 514 can distribute multimedia broadcast programs via an access network 518 to commercial and/or residential buildings 502 (only one of which is shown) that house a gateway 504 (such as a residential or commercial gateway). The access network 518 can represent a group of digital subscriber line access multiplexers (DSLAMs) located in a central office or a service area interface that provides broadband services over optical links or copper twisted pairs 519 to buildings 502. The gateway 504 can use common communication technology to distribute broadcast signals to media devices 508 such as computers, television sets, managed in some instances by a media controller 507 (such as an infrared or RF remote control, gaming controller, etc.). In one embodiment, the gateway 504 can deliver the media content to media processors 506 such as Set-Top Boxes (STBs) or gaming consoles, which in turn present broadcast channels to the media devices 508.

In another embodiment, the gateway 504 can deliver the media content to the display devices 508 without using an intermediary media processor 506 (such as an STB). For instance, the gateway 504 can selectively bypass the set top box 506 and deliver the media content directly to the display device 508. The gateway 504 can determine a type or format of media content that is being received and can determine if the media content is compatible with a set top box 506 connected with a particular display device 508. If there is an incompatibility determined, then the gateway 504 can bypass the set top box 506 and deliver the media content directly to the display device 508. In another example, the gateway 504 can determine the compatibility issue and can reformat the media content for delivery based on the compatibility determination. In one embodiment, the buildings 502 may not be equipped with any STB's 506 and thus the gateway 504 delivers media content to each of the display devices 108 directly.

In another embodiment, the gateway 504 can utilize a common format or protocol for delivery of data to a plurality of communication devices (e.g., television, desktop computer, video gaming console, mobile cellular phone, camera, media player, and so forth) throughout the residence or other building 502. For example, Digital Living Network Alliance (DLNA) technology can be utilized by the gateway 504, as well as other communication devices in the residence or building 502, to enable PC Internet, mobile and consumer electronics devices to find each other, communicate, share and display multimedia content while adhering to digital rights management associated with the media content. In this embodiment, the gateway 504 can communicate directly with one or more of the display devices 508 without using an STB.

The gateway 504, the media processors 506, and/or the media devices 508 can utilize tethered interface technologies (such as coaxial, phone line, or power line wiring) and/or can operate over a common wireless access protocol, such as Wireless Fidelity (WiFi). With these interfaces, unicast communications can be invoked by the gateway 504 and/or the media processors 506 from the subsystems of the IPTV media system for services, such as video-on-demand (VoD), browsing an electronic programming guide (EPG), or other infrastructure services.

Some of the network elements of the IPTV media system 500 can be coupled to one or more computing devices 530. The computing devices 530, or a portion thereof, can operate as a web server for providing portal services over an Internet Service Provider (ISP) network 532 to wireline media devices 508 or wireless communication devices 516 (e.g., cellular phone, laptop computer, etc.) by way of a wireless access base station 517. The base station 517 can operate according to common wireless access protocols such as WiFi, or cellular communication technologies (such as GSM, CDMA, UMTS, WiMAX, Software Defined Radio or SDR, and so on).

In one embodiment, a satellite broadcast television system can be used in place of, or in addition to, the IPTV media system 500. In this embodiment, signals transmitted by a satellite 515 carrying media content can be intercepted by a common satellite dish receiver 531 coupled to the building 502. Modulated signals intercepted by the satellite dish receiver 531 can be transferred to the media processors 506 for decoding and distributing broadcast channels to the media devices 508. The media processors 506 can be equipped with a broadband port to the IP network 532 to enable services such as VoD and EPG described above.

In yet another embodiment, an analog or digital broadcast distribution system, such as cable TV system 533, can be used in place of, or in addition to, the IPTV media system described above. In this embodiment, the cable TV system 533 can provide Internet, telephony, and interactive media services.

It is contemplated that the present disclosure can apply to any present or next generation over-the-air and/or landline media content services system. In one embodiment, an IP Multimedia Subsystem (IMS) network architecture can be utilized to facilitate the combined services of circuit-switched and packet-switched systems in delivering the media content to one or more viewers.

In one embodiment, the computing devices 530 can include a controller 580 for processing the data captured by the range camera 140 and/or the vision camera(s) 150 of camera system 125. The controller 580 can receive a depth map captured by the range camera 140 and can generate a disparity map from the data in the depth map. The controller 580 can determine the accuracy of the depth map pixels using the disparity map and a confidence map, which was generated by the range camera 140. The controller 580 can adjust inaccurate pixels of the depth map based on a cost function that has been defined for the depth map, such as through use of a graph-cut or belief-propagation process. The adjusted depth map can then be utilized for generating 3D media content, such as in combination with the intensity map of the range camera 140 and/or the left and right image pairs captured by the vision cameras 150. In one embodiment, the computing devices 530 provide the various data, including the adjusted depth map, to a processor (such as display device 508, STB 506, and/or gateway 504) at the building 502 for generating the 3D images. In another embodiment, the computing devices generate the 3D media content and transmit the 3D media content to the building 502 for presentation on the display device 508.

Upon reviewing the aforementioned embodiments, it would be evident to an artisan with ordinary skill in the art that said embodiments can be modified, reduced, or enhanced without departing from the scope and spirit of the claims described below. The embodiments described above can be adapted to operate with any device capable of performing in whole or in part the steps described for method 200. For example, an STB, a gateway, a PC, or another device can be adapted to generate the disparity map and adjust the inaccurate pixels of the depth map (of the range camera 140) as described above. This data can then be utilized in generating 3D media content in combination with the images captured by the vision camera(s) 150.

In one embodiment, an accurate high resolution depth map can be provided which is from the viewpoint of one of a pair of high resolution vision cameras. The low resolution depth map, captured by a range camera or other range determining device, can first be warped and converted into a depth/disparity map in the coordinate frame of, and at the same resolution as, the one vision camera. The pixels can then be classified into regions according to whether the range camera depth map is trustworthy. A graph cut optimization can then be performed on all or a portion of the untrustworthy regions. Experimental results utilizing this process show that the process is able to upsample the depth map by a factor of 10×10 with accurate depth details. The improvements can be visually perceptible on a 3D auto-stereoscopic display.

In another embodiment, one or more of the steps described herein can be performed in real-time. For instance, a range camera utilizing a real-time frame rate can be used and one or more of the other steps can also be performed in real-time to allow for dynamic video processing. In another embodiment, the application of the optimization analysis (e.g., graph-cut or belief-propagation) can be based on a cost function associated with the inaccurate pixels. The resulting adjustments can be applied to only those inaccurate pixels. Although, the present disclosure contemplates applying the adjustments to other configurations of the pixels, such as to the inaccurate pixels and to a portion of the accurate pixels.

Other suitable modifications can be applied to the present disclosure without departing from the scope of the claims below. Accordingly, the reader is directed to the claims section for a fuller understanding of the breadth and scope of the present disclosure.

Figure 6:
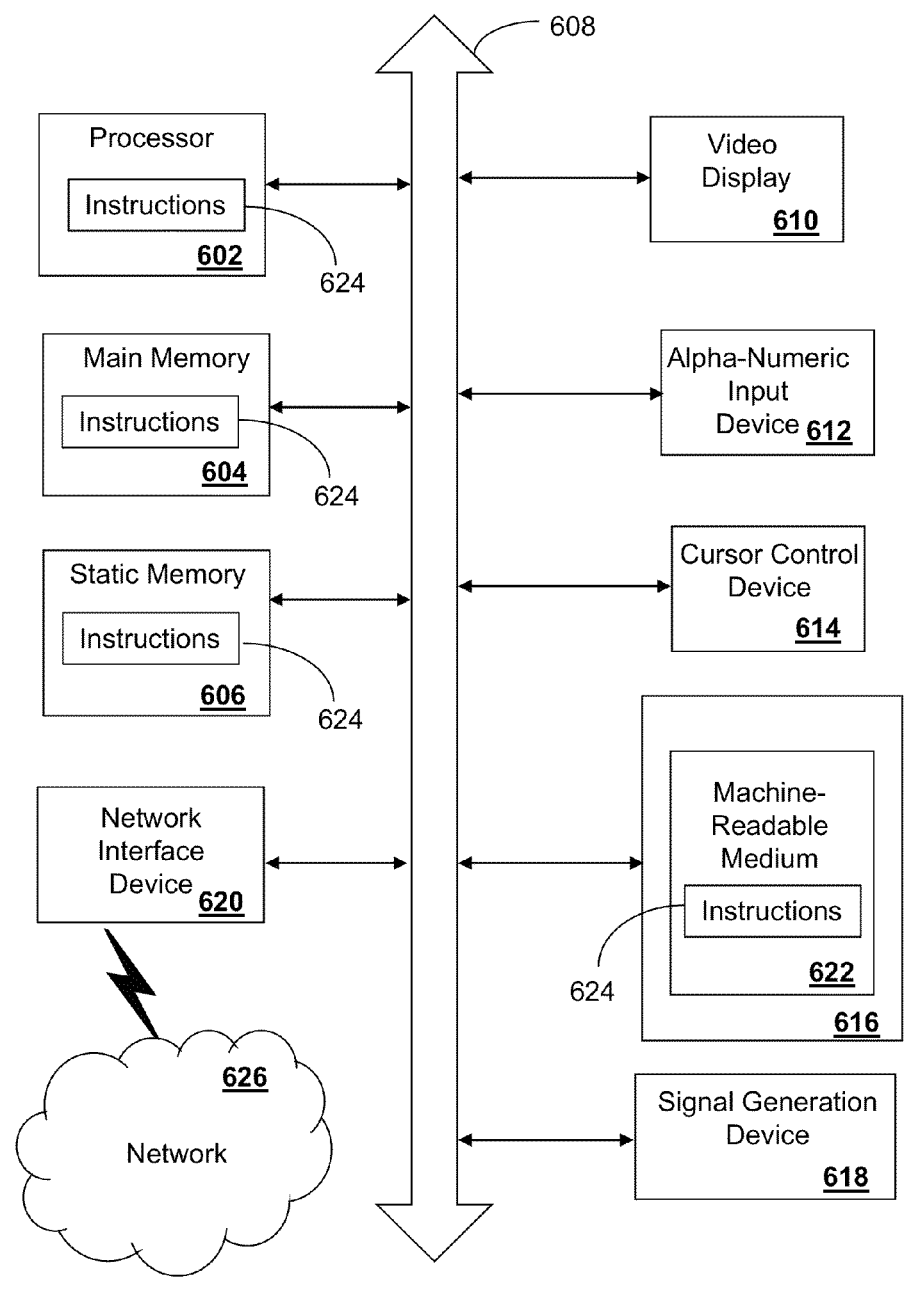
FIG. 6 is a diagrammatic representation of a machine in the form of a computer system within which a set of instructions, when executed, may cause the machine to perform any one or more of the methodologies discussed herein.

FIG. 6 depicts an exemplary diagrammatic representation of a machine in the form of a computer system 600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium comprising instructions, which, responsive to being executed by a processor, cause the processor to perform operations comprising:
    determining an accuracy of pixels in a depth map by identifying pixels as either accurate or inaccurate based on a confidence map and a disparity map;
    adjusting the depth map by adjusting inaccurate pixels in the depth map;
    generating three-dimensional media content based on images captured by a camera and the adjusted depth map; and
    providing the three-dimensional media content for presentation at a display device.

2. The non-transitory computer-readable storage medium of claim 1, wherein the processor is part of a media processor connected with the display device.

3. The non-transitory computer-readable storage medium of claim 1, wherein the inaccurate pixels are identified based on measuring a disparity variance for a pre-determined region surrounding each pixel of a disparity map generated from the depth map.

4. The non-transitory computer-readable storage medium of claim 1, wherein the depth map is captured by a range camera.

5. The non-transitory computer-readable storage medium of claim 1, wherein the adjusted depth map is based on the adjustments to the inaccurate pixels in the depth map using a graph-cut analysis.

6. The non-transitory computer-readable storage medium of claim 1, wherein the adjusted depth map is based on the adjustments to the inaccurate pixels in the depth map using a belief-propagation analysis.

7. The non-transitory computer-readable storage medium of claim 1, wherein the adjustments to the inaccurate pixels in the depth map are based on a cost function being applied to the inaccurate pixels.

8. The non-transitory computer-readable storage medium of claim 1, wherein the depth map is generated based on measuring parameters associated with infrared light to obtain range data associated with an object in the images.

9. The non-transitory computer-readable storage medium of claim 1, wherein homographic warping approximation is applied for calibration associated with the three-dimensional media content.

10. A method comprising:
receiving, by a processor, images captured by a camera;
determining an accuracy of pixels in a depth map by identifying pixels as either accurate or inaccurate based on a confidence map and a disparity map;
adjusting the depth map by adjusting inaccurate pixels in the depth map; and
generating, by the processor, three-dimensional media content based on the images and the adjusted depth map.

11. The method of claim 10, wherein the processor is coupled to a display device, and further comprising providing the three-dimensional media content to the display device for presentation at the display device.

12. The method of claim 10, wherein the inaccurate pixels are identified based on measuring a disparity variance for a pre-determined region surrounding each pixel of the disparity map generated from the depth map.

13. The method of claim 10, wherein the depth map is captured by a range camera.

14. The method of claim 10, wherein the adjusted depth map is based on the adjustments to the inaccurate pixels in the depth map using a graph-cut analysis.

15. The method of claim 10, wherein the adjusted depth map is based on the adjustments to the inaccurate pixels in the depth map using a belief-propagation analysis.

16. The method of claim 10, wherein the adjustments to the inaccurate pixels in the depth map are based on a cost function being applied to the inaccurate pixels.

17. The method of claim 10, wherein the depth map is generated based on measuring parameters associated with infrared light to obtain range data associated with an object in the images.

18. The method of claim 10, wherein homographic warping approximation is applied for calibration associated with the three-dimensional media content.

19. A device comprising:
a memory to store computer instructions; and
a processor coupled with the memory, wherein the processor, responsive to executing the computer instructions, performs operations comprising:
receiving images captured by a camera;
determining an accuracy of pixels in a depth map by identifying pixels as either accurate or inaccurate based on a confidence map and a disparity map;
adjusting the depth map by adjusting inaccurate pixels in the depth map; and
generating three-dimensional media content based on the images and an adjusted depth map, wherein the adjusted depth map is based on adjustments to inaccurate pixels in a depth map.

20. The device of claim 19, wherein the processor is coupled to a display device, and wherein the operations further comprise providing the three-dimensional media content to the display device for presentation at the display device.

* * * * *